United States Patent Office.

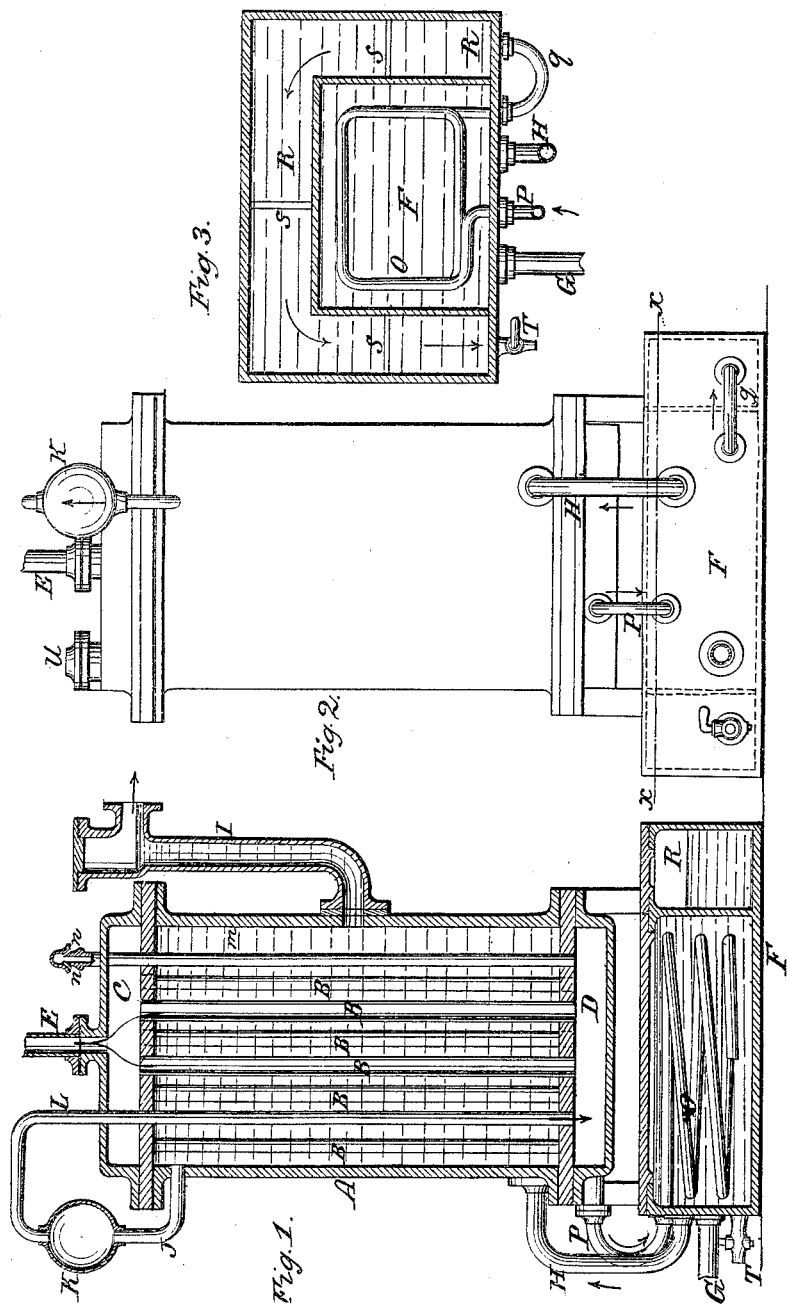
W. A. Gray.
Distilling and Condensing App's.
Nº 90,444.   Patented May 25, 1869.
Witnesses
A. W. Almquist
O. Hinchman
Inventor.
W. Albert Gray
per
Munn & Co
Att'ys.

WILLIAM ALBERT GRAY, OF NEW YORK, N. Y., ASSIGNOR TO J. HOWARD WAINWRIGHT, OF SAME PLACE.

Letters Patent No. 90,444, dated May 25, 1869

IMPROVED APPARATUS FOR DISTILLING AND PRODUCING FRESH POTABLE WATER.

The Schedule referred to in these Letters Patent and making part of the same.

*To all whom it may concern:*

Be it known that I, WILLIAM ALBERT GRAY, of the city, county, and State of New York, have invented a new and useful Improvement in Distilling and Condensing-Apparatus; and I do hereby declare that the following is a full, clear, and exact description thereof, which will enable others skilled in the art to make and use the same, reference being had to the accompanying drawings, forming part of this specification.

This invention relates to new and useful improvements in apparatus for producing fresh water, for use on shipboard, and for other purposes, from salt water, and from other impure water, and aerating the same; and consists in vaporizing sea-water, or other impure water, and condensing and aerating the same, as hereinafter more fully described; the arrangement being similar to that described in the patent granted to A. Normandy, dated October 5, 1858, for a similar purpose; the design, in the present invention, being to simplify and cheapen the apparatus, and thereby adapt it for more general use.

In the accompanying drawings—

Figure 1, represents a sectional elevation of the apparatus.

Figure 2 is an outside view.

Figure 3 is a horizontal section through the line $x\,x$, fig. 2.

Similar letters of reference indicate corresponding parts.

In producing pure fresh water from salt water, or from other water impregnated with mineral or other foreign substances, I take steam which has been generated from such impure water, and introduce it into a series of tubes, which is partially surrounded by cold water for condensing it, and then I convey the water of condensation through a coil in a cooler into the filter, from whence it is discharged pure, cool, and fit for use; but in its progress from the condensing-tubes, it is aerated by being combined with the vapor and gases which rise from the condensing-water, and also from contact with atmospheric air.

A, in the drawing, is a water-tight vessel, which contains the condensing-tubes B.

C is a chamber above the ends of the tubes, and D is a chamber below the tubes.

These chambers are connected with the vessel A, each being in communication with the tubes B.

E represents the pipe through which the steam is introduced.

The water of condensation is received into the chamber D.

F is the cooler, into which a current of cold water is forced or introduced through the pipe G.

This cold sea or other water fills the cooler F, and rises up through the pipe H into the vessel A, around the tubes B, and fills that vessel.

I is an overflow-pipe, which, as will be seen, connects with the vessel A near its middle. As the overflow is taken from this point, there would not be a circulation of water above it, and the condensation of the steam in the tubes B would take place mainly below it, as up to that point the cold water would be constantly renewed.

There being no circulation of cold water above, the water surrounding the tubes B will become heated by the steam, and the air and more volatile gases will escape, and pass from the vessel, through the pipe J, into the globe K, and from thence, by the pipe L, down through the vessel A, and be discharged into the chamber D, where they mingle with the condensed steam or water of condensation.

This chamber D is in communication with the atmosphere by means of the pipe M, which extends from the chamber D up through the vessel A and chamber C, and has access to the atmosphere through the apertures $n$, as seen where the pipe is broken away in the drawing. A vacuum in the chamber D is thereby prevented.

It will be seen that the air and volatile gases, which were expelled in the process of distillation, and which, in their due proportions, were not carried off by the steam, are supplied in the manner stated.

It is well known that simple distilled water is not only unpleasant and insipid to the taste, but that its continued use is absolutely injurious to the human system. Simply mingling it with atmospheric air does not alone supply the requisite qualities, but mingling with it the first products of distillation, or the vapor which escapes from the condensing-water at a comparatively low temperature, as stated above, in combination with the atmosphere, renders the water, when properly cooled and filtered, not only pleasant to the taste, but perfectly healthy for use under all circumstances.

After the water has been thus aerated in the chamber D, it is conveyed into the coil O, through the pipe P. Here the water is cooled, or the temperature is reduced to that of the cooling-medium.

From the coil the water passes into the filter through the pipe $q$.

R is the filter. The filter surrounds three sides of the cooler F, as seen in fig. 3. It is filled with charcoal or sand, or with both combined, or with any other good filtering-material.

S represents partitions in the filter, more or less in number, which compel the water to rise and flow over each, and pass through the filtering-material, between the partitions, as indicated by the arrows.

After passing through the filter, the water is drawn from the faucet T, ready for use.

The pipes J and L are so placed, that should the chamber D become filled with water, they might act as a siphon, and convey condensing-water into the chamber D, but such an occurrence is prevented by the globe K, which would break the current.

In come cases it may be found necessary to use steam from other sources than the boiler, as, for instance, the exhaust steam from a steam-engine, or steam from any other source. In such cases the steam is introduced through the pipe U into the chamber C, for condensation, as before described.

By this simple and compact arrangement all the advantages of the expensive and complicated apparatus of Normandy are secured, and is adapted to uses and localities for which the "Normandy" was never designed.

Having thus described my invention,

What I claim as new, and desire to secure by Letters Patent, is—

The combination and arrangement of the vessel A, chambers C D, cooler F, and filter R, with the tubes and parts connected therewith, substantially as and for the purposes herein shown and described.

The above specification of my invention signed by me, this 24th day of March, 1869.

WM. ALBERT GRAY.

Witnesses:
   FRANK BLOCKLEY,
   E. GREENE COLLINS.